United States Patent
Kim et al.

(10) Patent No.: US 10,152,792 B2
(45) Date of Patent: Dec. 11, 2018

(54) METHOD AND APPARATUS FOR IDENTIFYING LIVING EYE

(71) Applicants: IRITECH, INC., Fairfax, VA (US); Dae Hoon Kim, Seoul (KR)

(72) Inventors: Dae Hoon Kim, Seoul (KR); Hyeong In Choi, Seoul (KR); Byoung Jin Jun, Seoul (KR); Min Su Oh, Seoul (KR); Tran Ho Truc Phan, Seoul (KR); Thi Thanh Tuyen Nguyen, Seoul (KR); Vladimir Novik, Seoul (KR)

(73) Assignees: Iritech, Inc., Fairfax, VA (US); Dae Hoon Kim, Seoul (KR)

( * ) Notice: Subject to any disclaimer, the term of this patent is extended or adjusted under 35 U.S.C. 154(b) by 0 days.

(21) Appl. No.: 14/646,007

(22) PCT Filed: Dec. 6, 2012

(86) PCT No.: PCT/KR2012/010536
§ 371 (c)(1),
(2) Date: May 19, 2015

(87) PCT Pub. No.: WO2014/077447
PCT Pub. Date: May 22, 2014

(65) Prior Publication Data
US 2015/0294464 A1    Oct. 15, 2015

(30) Foreign Application Priority Data
Nov. 19, 2012 (KR) .................. 10-2012-0130998

(51) Int. Cl.
*G06T 7/00* (2017.01)
*G06K 9/00* (2006.01)
*G06T 1/00* (2006.01)

(52) U.S. Cl.
CPC ........ *G06T 7/0016* (2013.01); *G06K 9/00597* (2013.01); *G06K 9/00906* (2013.01);
(Continued)

(58) Field of Classification Search
CPC ............ G06K 9/00597; G06K 9/00906; G06T 1/0007; G06T 2207/10004; G06T 7/0016; G06T 7/602
(Continued)

(56) References Cited

U.S. PATENT DOCUMENTS

| | | | | |
|---|---|---|---|---|
| 5,901,238 A | * | 5/1999 | Matsushita | .............. G06K 9/00 382/117 |
| 6,247,813 B1 | * | 6/2001 | Kim | ................... G06K 9/00597 351/206 |

(Continued)

FOREIGN PATENT DOCUMENTS

| | | |
|---|---|---|
| JP | 2000-083930 A | 3/2000 |
| JP | 2006-099718 A | 4/2006 |

(Continued)

OTHER PUBLICATIONS

PCT International Search Report for PCT Counterpart Application No. PCT/KR2012/010536, 5 pages (including English translation), (dated Aug. 23, 2013).

(Continued)

*Primary Examiner* — Manuchehr Rahmjoo
(74) *Attorney, Agent, or Firm* — Womble Bond Dickinson (US) LLP

(57) ABSTRACT

The present invention relates to a method and apparatus for identifying a living eye, in which IR LED lighting and lighting for varying the ambient illumination are installed on the front surface or one side of an iris recognition camera so as to determine whether an iris of an eye is an iris of a living eye when capturing an iris image by the iris recognition
(Continued)

camera, using one or more criteria of whether the ratio of the sizes of the iris and pupil changes by the variation of the ambient illumination, whether the number or location of the IR LEDs focused on the iris and/or the pupil changes, whether the region of the iris image changes by eye blinking, and whether the direction of the gaze changes.

13 Claims, 5 Drawing Sheets

(52) U.S. Cl.
CPC .. *G06T 1/0007* (2013.01); *G06T 2207/10004* (2013.01); *G06T 2207/10152* (2013.01)

(58) Field of Classification Search
USPC .......................................................... 382/117
See application file for complete search history.

(56) References Cited

U.S. PATENT DOCUMENTS

| | | | | |
|---|---|---|---|---|
| 6,714,665 | B1* | 3/2004 | Hanna | G06K 9/00 382/106 |
| 2003/0169907 | A1* | 9/2003 | Edwards | G06K 9/00248 382/118 |
| 2009/0174865 | A1* | 7/2009 | Privitera | A61B 3/112 351/246 |
| 2011/0007949 | A1* | 1/2011 | Hanna | G06K 9/00604 382/107 |

FOREIGN PATENT DOCUMENTS

| | | |
|---|---|---|
| KR | 10-2000-0061065 A | 10/2000 |
| KR | 10-0320188 B1 | 1/2002 |
| KR | 10-0565959 B1 | 3/2006 |
| KR | 10-0711110 B1 | 4/2007 |

OTHER PUBLICATIONS

PCT Written Opinion of the International Searching Authority for PCT Counterpart Application No. PCT/KR2012/010536, 9 pages, (dated Aug. 23, 2013).

PCT International Preliminary Report on Patentability (Chapter II of the Patent Cooperation Treaty) for PCT Counterpart Application No. PCT/KR2012/010536, 25 pages (including English translation), (dated Mar. 4, 2015).

\* cited by examiner

[Fig. 1]
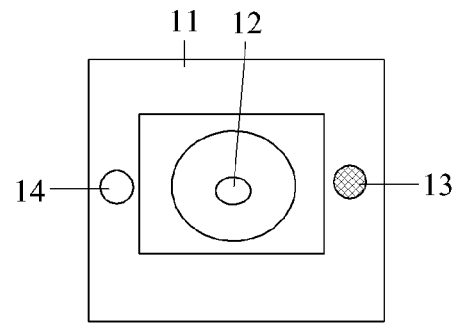
[Fig. 2]
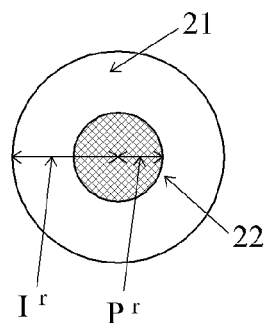
[Fig. 3]
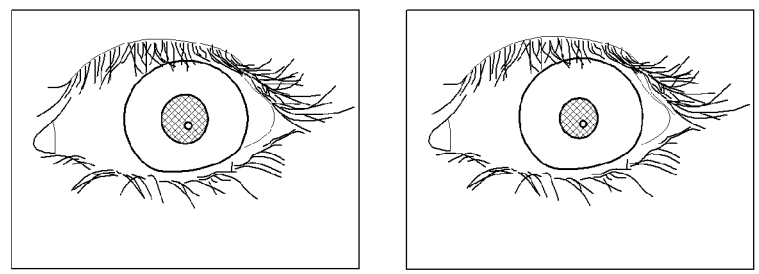

[Fig. 4]
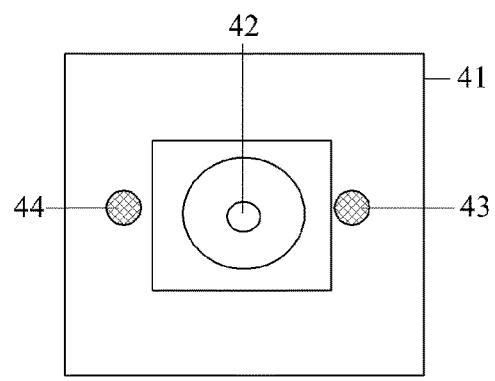
[Fig. 5]
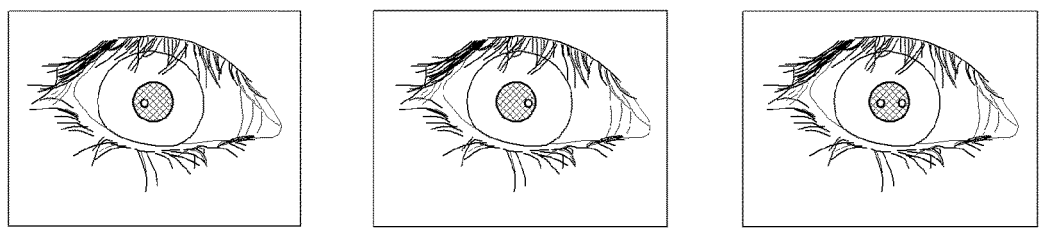

[Fig. 6]
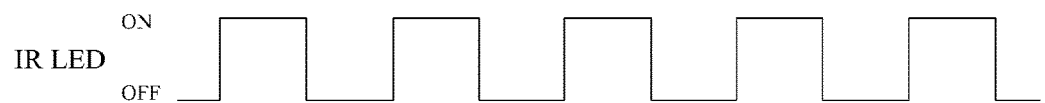
[Fig. 7]
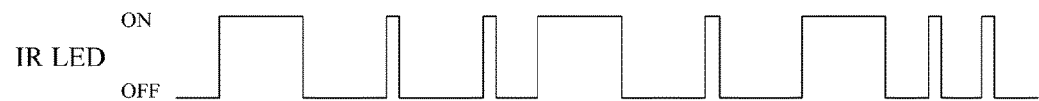
[Fig. 8]
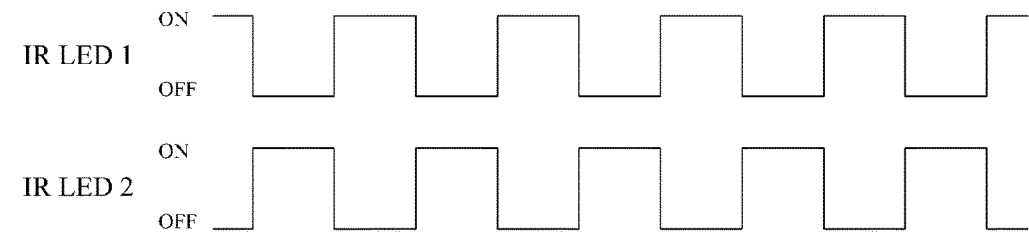
[Fig. 9]
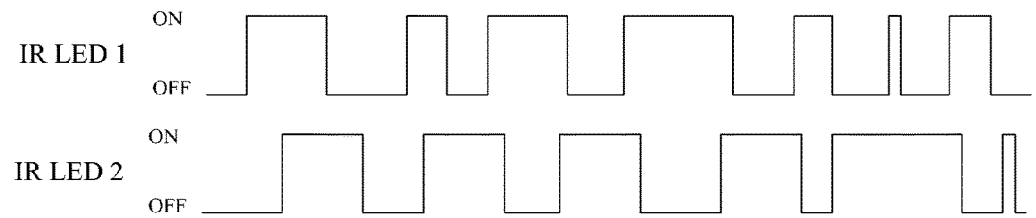

[Fig. 10]
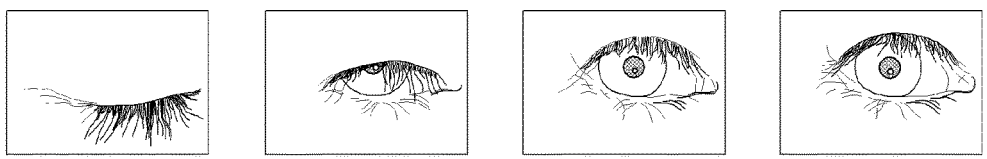
[Fig. 11]
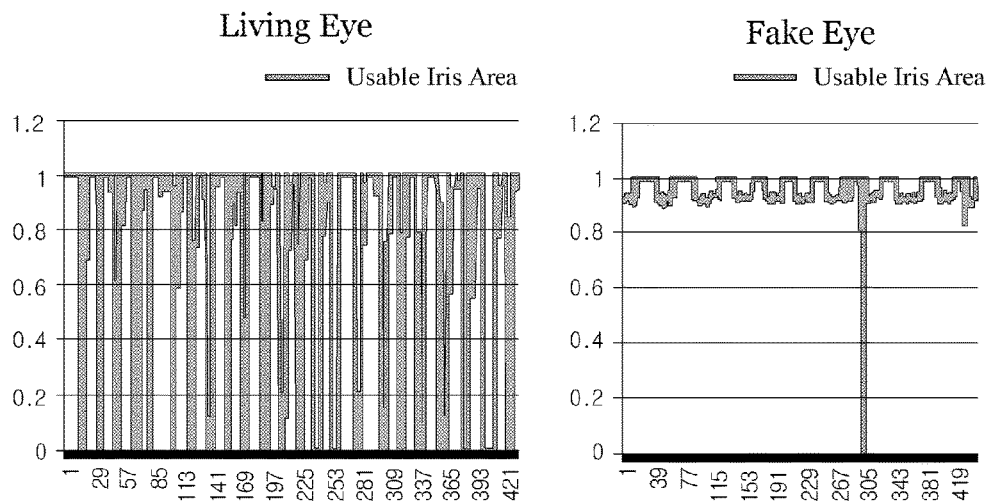

[Fig. 12]
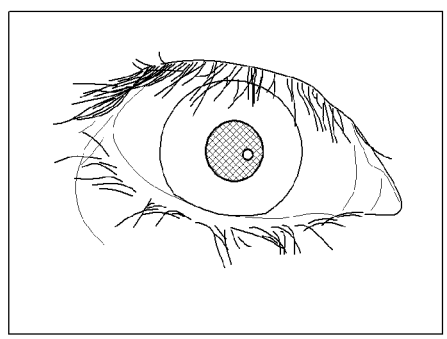
Forward Gaze
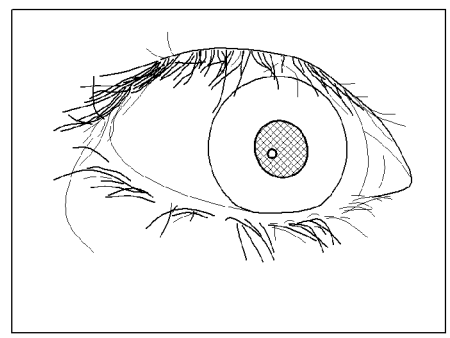
Sideward Gaze
[Fig. 13]
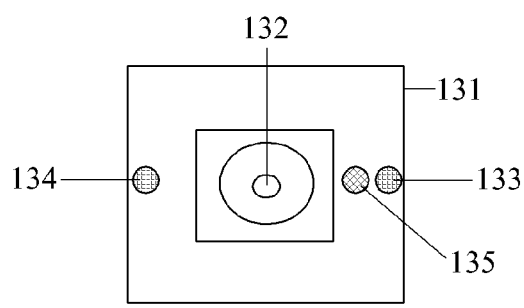

METHOD AND APPARATUS FOR IDENTIFYING LIVING EYE

CROSS-REFERENCE TO RELATED APPLICATIONS

This patent application is a U.S. National Phase Application under 35 U.S.C. § 371 of International Application No. PCT/KR2012/010536, filed Dec. 6, 2012, entitled METHOD AND APPARATUS FOR IDENTIFYING LIVING EYE, which claims priority to Korean Patent Application No. 10-2012-0130998, filed Nov. 19, 2012.

TECHNICAL FIELD

The present invention relates to a method and apparatus for identifying a living eye, which is provided with IR LEDs and a light source mounted on a front side or one side of an iris recognition camera to change ambient brightness and can determine whether an iris image captured by the iris recognition camera is that of a living eye based on one or more criteria of whether a ratio of pupil size to iris size changes by a change of the ambient brightness, whether the number or location of IR LEDs reflected in an iris and/or a pupil changes, whether an iris image area changes upon eye blinking, and whether a gaze point changes.

BACKGROUND ART

As iris recognition technology is used in various fields associated with personal information protection and security, there is a high risk of hacking using a fake iris, such as a printed iris image, a picture of an iris, a model of an eye, a contact lens having an iris pattern printed thereon and the like, and thus the importance of technology for identifying a living eye or a fake eye has increased.

Korean Patent Publication No. 10-2000-0061065 A discloses a conventional technology for identifying a living eye or a fake eye, which includes obtaining an iris image using two light sources and determining whether a reflected light image appears in the iris image obtained from a camera by turning one of the light sources ON/OFF. However, there still exists a problem that, if a counterfeiter finds out a reflection location beforehand and puts a fake eye, such as a printed eye image, a model of an eye or the like, already having a reflection image at the reflection location in front of a camera, an iris recognition system can erroneously determine that the fake eye is a living eye.

SUMMARY

It is an aspect of the present invention to provide a method and apparatus for identifying a living eye, which is provided with IR LEDs and a light source mounted on a front side or one side of an iris recognition camera to change ambient brightness and can determine whether an iris image captured by the iris recognition camera is that of a living eye based on one or more criteria of whether a ratio of pupil size to iris size changes by a change of the ambient brightness, whether the number or location of IR LEDs reflected in an iris and/or a pupil changes, whether an iris image area changes upon eye blinking, and whether a gaze point changes.

It is another aspect of the present invention to provide a method and apparatus for identifying a living eye, which is provided with an IR LED used for illumination for iris image capture or used to make an IR LED reflection image on an iris and/or a pupil, and includes capturing an iris image while supplying a pulse with a regular or irregular cycle as a signal for operating the IR LED, comparing the cycle of the pulse supplied to the IR LED with a cycle of the iris image showing IR LED reflection from an iris and/or a pupil measured from the iris image, and determining that the iris is that of a living eye if the cycles are identical.

In accordance with one aspect of the present invention, a method for identifying a living eye includes: capturing an iris image while turning ON/OFF a light source mounted on a front side or one side of an iris recognition camera with a predetermined cycle; measuring a ratio of pupil size to iris size in the captured iris image; and determining that the iris is that of a living eye if there is a change in the ratio of pupil size to iris size.

In accordance with another aspect of the present invention, a method for identifying a living eye includes: capturing an iris image while turning ON/OFF IR LEDs mounted on a front side or one side of an iris recognition camera with a predetermined cycle; recognizing IR LEDs reflected in an iris and/or a pupil in the captured iris image; and determining whether the iris is that of a living eye by measuring a change in the number or location of IR LEDs reflected in the iris and/or the pupil.

In accordance with a further aspect of the present invention, a method for identifying a living eye includes: capturing an iris image while inducing eye blinking using an external signal generator, including an indicator LED and/or a voice guider configured to generate voice guidance, mounted on a front side of a camera; measuring a change in iris area in the captured iris image, and determining that the iris is that of a living eye if there is a change in the iris area.

In accordance with yet another aspect of the present invention, a method for identifying a living eye includes: capturing an iris image while inducing movement of a gaze point using an external signal generator, including an indicator LED and/or a voice guider, mounted on or built in a camera; measuring a change of the gaze point in the captured iris image; and determining that the iris is that of a living eye if there is a change of the gaze point.

In accordance with yet another aspect of the present invention, a method for identifying a living eye includes: capturing an iris image while turning ON/OFF a light source mounted on a front side or one side of a camera with a predetermined cycle; measuring a ratio of pupil size to iris size in the captured iris image; determining that the iris is that of a living eye if there is a change in the ratio of pupil size to iris size; capturing an iris image while turning ON/OFF IR LEDs with a predetermined cycle; recognizing IR LEDs reflected in the iris and/or the pupil in the captured iris image; determining whether the iris is that of a living eye by measuring a change in the number or location of IR LEDs reflected in the iris and/or the pupil; capturing an iris image while inducing eye blinking using an external signal generator such as an indicator LED and/or a voice guider; measuring a change in iris area in the captured iris image; determining that the iris is that of a living eye if there is a change in iris area; capturing an iris image while inducing movement of a gaze point using the external signal generator such as the indicator LED and/or the voice guider; measuring a change of the gaze point in the captured iris image; and determining that the iris is that of a living eye if there is a change of the gaze point.

In accordance with yet another aspect of the present invention, an apparatus for identifying a living eye using an iris recognition camera includes: a camera lens for capturing an iris image; a light source mounted on a front side or one side of the iris recognition camera and configured to be turned on or off with a predetermined cycle to cause a change of a pupil size by changing ambient brightness; IR LEDs mounted on the front side or one side of the iris recognition camera and configured to be turned on or off with a predetermined cycle to generate IR LED reflection from an iris and/or a pupil; and a means for determining whether the iris is that of a living eye by checking whether a ratio of pupil size to iris size changes by a change of ambient brightness or whether the number or location of IR LEDs reflected in the iris and/or the pupil changes using the iris image captured by the iris recognition camera, or a means for determining whether the iris is that of a living eye by checking both whether a ratio of pupil size to iris size changes by a change of ambient brightness and whether the number or location of IR LEDs reflected in the iris and/or the pupil changes using the iris image captured by the iris recognition camera.

The apparatus may further include an external signal generator, including an indicator LED and/or a voice guider, provided to a typical iris recognition camera in order to determine whether the iris is that of a living eye based on change in iris area upon eye blinking and a change of a gaze point.

The iris image may be captured by the iris recognition camera while supplying a pulse with a regular or irregular cycle as a signal for operating the IR LEDs mounted on the front side of the iris recognition camera, and it may be determined whether the iris is that of a living eye by comparing a cycle of IR LED reflection from the iris and/or the pupil measured from the captured iris image with the cycle of the pulse supplied to the IR LEDs.

The present invention has an effect of accurately determining whether an iris is that of a living eye or a fake iris based on one or more criteria of whether a ratio of pupil size to iris size changes by changing ambient brightness using a light source mounted on a front side or one side of a camera, whether the number or location of IR LEDs reflected in an iris and/or a pupil changes, whether an iris area changes upon eye blinking, and whether a gaze point changes.

In addition, the present invention has an effect of increasing accuracy of living eye identification by capturing an iris image while supplying a pulse with a regular or irregular cycle as a signal for operating an IR LED used for illumination for iris image capture or used to make an IR LED reflection image on an iris and/or a pupil, comparing the cycle of the pulse supplied to the IR LED with a cycle of the iris image showing IR LED reflection from an iris and/or a pupil measured from the iris image, and determining that the iris is that of a living eye if the cycles are identical.

BRIEF DESCRIPTION OF THE DRAWINGS

FIG. 1 is a front view of an exemplary iris recognition camera according to the present invention.

FIG. 2 is a view showing a shape of an iris and a pupil.

FIG. 3 is a view showing a change of a pupil size captured by the iris recognition camera according to the present invention upon variation of ambient brightness.

FIG. 4 is a front view of another exemplary iris recognition camera according to the present invention.

FIG. 5 is a view of an iris image in which IR LED reflection from a pupil appears, showing that it can be determined whether an iris is that of a living eye by variously changing an IR LED reflection location and the number of reflected IR LEDs.

FIG. 6 shows a waveform of a pulse with a regular cycle as a signal for operating an IR LED.

FIG. 7 shows a waveform of a pulse with an irregular cycle as a signal for operating an IR LED.

FIG. 8 shows waveforms of pulses with a regular cycle as signals for operating two IR LEDs.

FIG. 9 shows waveforms of pulses with an irregular cycle as signals for operating two IR LEDs.

FIG. 10 is a view showing change in a size of an iris area upon eye blinking.

FIG. 11 is a view showing change in iris area of a living eye and a fake eye upon blinking.

FIG. 12 is a view showing a difference between gaze points.

FIG. 13 is a front view of a further exemplary iris recognition camera according to the present invention.

DESCRIPTION OF REFERENCE NUMERALS

11: Iris Recognition Camera 12: Camera Lens
13: IR LED 14: Light Source
21: Iris 22: Pupil
41: Iris Recognition Camera 42: Camera Lens
43: IR LED(1) 44: IR LED(2)
P$^r$: Radius of Pupil I$^r$: Radius of Iris
131: Iris Recognition Camera 132: Camera Lens
133: Indicator LED(1) 134: Indicator LED(2)
135: IR LED

DETAILED DESCRIPTION

A method for identifying a living eye according to an exemplary embodiment of the present invention includes capturing an iris image while turning ON/OFF a light source mounted on a front side or one side of an iris recognition camera with a predetermined cycle, measuring a ratio of pupil size to iris size in the captured iris image, and determining that the iris is that of a living eye if there is a change in the ratio of pupil size to iris size.

A method for identifying a living eye according to another exemplary embodiment of the present invention includes capturing an iris image while turning ON/OFF IR LEDs mounted on a front side or one side of an iris recognition camera with a predetermined cycle, recognizing IR LEDs reflected in the iris and/or the pupil in the captured iris image, and determining whether the iris is that of a living eye by measuring a change in the number or location of IR LEDs reflected in the iris and/or the pupil.

Hereinafter, exemplary embodiments of the invention will be described.

As a technology for recognizing an iris having personal identification information is used for various fields, there is a high risk of hacking using a fake iris, such as a printed iris image, a picture of an iris, a model of an eye, a contact lens having an iris pattern printed thereon and the like, and thus the importance of a technology for identifying a living eye or a fake eye has increased.

In the embodiments, technology used to determine whether an iris is that of a living eye is based on a principle that a pupil contracts or dilates according to change in ambient brightness and the ratio of pupil size to iris size is changed.

In addition, it is determined whether an iris is that of a living eye based on a fact that an eye has a curved surface and is made up of light reflecting materials and by sensing physical motions of an eye and its surroundings, such as eye blinking, a change of a gaze point (glance) or the like.

More particularly, although a pupil of a living eye contracts or dilates according to change in ambient brightness and the ratio of pupil size to iris size is changed, a pupil of a printed iris image, a picture of an iris and a model of an eye does not contract or dilate even when ambient brightness is changed.

Based on this, the present invention is constituted such that a light source is turned on or off to make a pupil contract or dilate and a change of the ratio of pupil size to iris size is measured. If there is a change in the ratio, it is determined that the iris is that of a living eye, and if not, it is determined that the iris is a fake iris.

The present invention is constituted to determine whether an iris is that of a living eye using at least one of the following methods: measuring a change of the ratio of pupil size to iris size using visible light; measuring a change in the number or location of IR LEDs reflected in an iris and/or a pupil using IR LEDs; measuring a change in an iris area in an iris image captured while inducing eye blinking using an external signal such as an indicator LED and/or voice guidance from a voice guider; and measuring a change of a gaze point while inducing movement of a gaze point in capturing an iris image. Embodiments according to the present invention will now be described.

<Embodiments>

Embodiments according to the present invention will be described in detail with reference to the accompanying drawings.

As used herein, the terms "iris recognition camera" and "camera" have the same meaning. FIG. 1 is a front view of an exemplary iris recognition camera (11 in FIG. 1) capable of identifying a living eye according to the present invention, and a light source (13 in FIG. 1) and an IR LED (14 in FIG. 1) are mounted on one side of a front side of the camera.

That is, in the iris recognition camera (11 in FIG. 1) capable of identifying a living eye according to the present invention, the light source (13 in FIG. 1) and the IR LED (14 in FIG. 1) to determine whether an iris is that of a living eye are further mounted on a front side of a typical camera used for iris identification.

Further, an external signal generator, such as an indicator LED and/or a voice guider configured to generate voice guidance, may be further mounted to induce eye blinking of a user, as needed.

Fig. 3 is a view illustrating that a pupil size is reduced or increased by turning on or off the light source (13 in FIG. 1) mounted on the iris recognition camera (11 in FIG. 1).

It can be easily known from FIG. 3 that a pupil in the left iris image captured while turning the light source off has a larger diameter than a pupil in the right iris image captured while turning the light source on.

More particularly, the iris recognition camera according to the present invention is constituted such that the light source mounted on the front side thereof is turned ON/OFF with a predetermined cycle in order to change ambient brightness while capturing an iris image, which causes variation of a pupil size according to change of the ambient brightness.

It can be determined whether an iris is a fake iris by measuring a change of a ratio of radius of pupil $P^r$ to radius of iris $I^r$ according to ON/OFF of the light source.

For a human eye, while a diameter of an iris hardly changes, a diameter of a pupil remarkably changes depending on illumination.

A change of the ratio of radius of pupil $P^r$ to radius of iris $I^r$ during a predetermined cycle can be represented as follows:

Ratio of Radius of Pupil to Radius of Iris=$P^r/I^r$

Since a size of a pupil of a fake eye does not change even upon change of illumination, there is no change in the ratio of radius of pupil to radius of iris.

In order to reduce an error rate, it is preferable to repeatedly measure the ratio of radius of pupil to radius of iris while turning the light source ON/OFF with a predetermined cycle.

When it is determined that the captured iris image is an iris of a user's living eye, a clear iris image may be selected from the iris images captured to determine whether an iris is that of a living eye and may be used for iris identification.

When the IR LED mounted on the front side of the iris recognition camera according to the present invention illuminates an iris and a pupil, the IR LED is reflected in the iris and the pupil and the reflection area appears white in the captured image.

In the case of a printed iris image or a picture of an iris, the IR LED is not reflected therefrom. Based on this, it can be determined whether an iris is that of a living eye or a fake iris.

FIG. 4 is a view showing another exemplary iris recognition camera according to the present invention. Two IR LEDs are mounted on the front side of the iris recognition camera.

The iris recognition camera captures an iris image while turning on or off a single or plural IR LEDs mounted on the front side thereof or mounted near the same with a predetermined cycle in order to reflect the IR LEDs from the iris and the pupil, and it is determined whether the captured iris image is an iris of a living eye or a fake iris by measuring a change in the number or location of IR LEDs reflected in the iris and/or the pupil.

More particularly, a) the camera captures an iris image while turning ON/OFF the single or plural IR LEDs mounted on the front side thereof or mounted near the same with a predetermined cycle, and it is checked whether the number of IR LEDs reflected in the iris and the pupil in the captured iris image is repeatedly changed;

b) the camera captures an iris image while turning ON/OFF the single or plural IR LEDs mounted on the front side thereof or mounted near the same with a predetermined cycle, and it is checked whether the number of IR LEDs reflected in the iris and the pupil in the captured iris image is changed in synchronization with the cycle set to turn the IR LEDs on or off;

c) the camera captures an iris image while turning ON/OFF the plural IR LEDs mounted on the front side thereof or mounted near the same with a predetermined cycle, and it is checked whether the location of IR LEDs reflected in the iris and the pupil in the captured iris image is repeatedly moved to the left or right side or both sides; and d) the camera captures an iris image while turning ON/OFF the plural IR LEDs mounted on the front side thereof or mounted near the same with a predetermined cycle, and it is checked whether the location of IR LEDs reflected in the iris and the pupil in the captured iris image is moved to the left or right side or both sides in synchronization with the cycle set to turn the IR LEDs on or off.

FIG. 5 is an iris image captured while turning ON/OFF the IR LEDs with a predetermined cycle, which shows one or two IR LEDs reflected in an iris and/or a pupil.

Next, a means for determining whether an iris is that of a living eye using a pulse signal used to turn ON/OFF the IR LEDs will be described.

FIG. 6 shows a waveform of a pulse with a regular cycle as a signal for operating the IR LED mounted on the front side of the iris recognition camera according to the present invention.

FIG. 7 shows a waveform of a pulse with an irregular cycle as a signal for operating the IR LED.

FIG. 8 shows waveforms of pulses with a regular cycle as signals for operating the two IR LEDs.

FIG. 9 shows waveforms of pulses with an irregular cycle as signals for operating the two IR LEDs.

A typical iris recognition camera is constituted to capture an iris image at a rate of 20 to 60 frames per second and measure a duration time of the reflected IR LED appearing in the captured iris image.

Using such features, the iris recognition camera may include a means for comparing a cycle of the pulse signal for operating the IR LED with a cycle of the image showing IR LED reflection measured from the iris image frames in order to determine whether an iris is that of a living eye or a fake iris, or a means for comparing an on-time or an off-time of the pulse signal supplied to the IR LED with a duration time of the image showing IR LED reflection from the iris and/or pupil measured from the captured iris image frames and a duration time of the image showing no IR LED reflection, in which it is determined that the iris is that of a living eye when the on/off-time of the pulse signal and the duration time are identical and it is determined that the iris is a fake iris when they are different.

That is, the iris recognition camera may include a means for comparing the time of turning ON/OFF the IR LEDs by supplying the pulse signal shown in FIGS. 6 through 9 to the same with the duration time of IR LED reflection measured from the captured iris image frames, in which it is determined that the iris is that of a living eye when the on/off-time and the duration time are identical and it is determined that the iris is a fake iris when they are not identical.

If two or more IR LEDs are used, since the pulse signals for the respective IR LEDs and the duration time of the respective IR LED reflections are compared, a living eye recognition rate can be improved.

When the IR LEDs are activated, the on-time of the IR LEDs may be set to be longer or shorter than one frame of the iris recognition camera capturing an iris image for iris identification, however, a longer on-time of the IR LEDs is advantageous in determining whether an iris is that of a living eye.

FIG. 10 is a view showing change in a size of an iris area upon eye blinking.

The iris recognition camera according to the present invention may include an external signal generator, such as an indicator LED and/or a voice guider configured to generate voice guidance, so as to induce a user to blink during a predetermined cycle when capturing an iris image.

For example, when captured for iris identification, a user may be induced to blink according to indicator LED flickering.

If a user iris is captured while blinking in accordance with the indicator LED or voice guidance from the voice guider, the size of an iris area in the captured image changes, and it can be determined whether the iris is that of a living eye or a fake iris by measuring change in the iris area in the image.

If the measuring result indicates that the iris area in the captured image changes, it is determined that the iris is that of a living eye. If not, it is determined that the iris is a fake iris.

Of course, if it is determined that the iris is that of a living eye in the iris recognition means and process, an iris image including more iris information may be selected from the iris images captured for determination of a living iris and may be used for iris identification.

FIG. 11 is a view showing change in iris area of a living eye and a fake eye upon blinking.

It can be checked from FIG. 11 that an iris area of a living eye definitely changes between 1 and 0 when blinking for a predetermined time.

It can also be checked from FIG. 11 that an iris area of a fake eye hardly changes and is maintained near 1.

FIG. 12 is a view showing a difference between gaze points, from which a difference between a forward gaze and a sideward gaze can be checked.

FIG. 13 is a view of a further exemplary iris recognition camera according to the present invention, which includes an IR LED and two indicator LEDs mounted on a front side thereof. By flickering of the indicator LEDs mounted on the left and right sides, change of the gaze point is induced. That is, the gaze point may be directed to the left side by flickering of the left indicator LED, and the gaze point may be directed to the right side by flickering of the right indicator LED. It can be determined whether an iris is that of a living eye by judging whether the gaze point changes in accordance with flickering of the left and right indicator LEDs.

The camera may also capture an iris image while inducing a user to change a gaze point (glance) according to voice guidance from the voice guider, and it is measured based on the captured iris image whether a user gaze point changes. If the measuring result indicates that the gaze point changes, it is determined that an iris is that of a living eye, and if not, it is determined that an iris is a fake iris.

In order to check change of the gaze point, a user may be induced to change his/her gaze point in any direction, i.e., the front and up/down/left/right side. The change of the gaze point may also be checked by inducing a user to only change his/her gaze point to some of the directions of the front and up/down/left/right side.

The light source, the IR LED, and the external signal generator including the indicator LED and the voice guider are controlled by a control program according to the present invention, and the control program is stored in a memory equipped in a control unit of the iris recognition camera.

Table 1 shows a brief summary of the means and process for determining an iris of a living eye and a fake iris according to the present invention.

As shown in Table 1, in this invention, it is determines whether an iris is that of a living eye based on one or more criteria of whether the ratio of pupil size to iris size changes by change in ambient brightness using the light source, whether the number or location of IR LEDs reflected in an iris and/or a pupil changes, whether an iris area changes upon eye blinking, and whether a gaze point changes.

TABLE 1

| Method 1 | Pupil/Iris Ratio | |
|---|---|---|
| Method 2 | IR LED Reflection | |
| Method 3 | Eye Blinking | |
| Method 4 | Gaze Point | |
| Method 5 | Pupil/Iris Ratio | IR LED Reflection |
| Method 6 | Pupil/Iris Ratio | Eye Blinking |
| Method 7 | Pupil/Iris Ratio | Gaze Point |
| Method 8 | IR LED Reflection | Eye Blinking |
| Method 9 | IR LED Reflection | Gaze Point |

TABLE 1-continued

| Method 10 | Eye Blinking | Gaze Point | |
|---|---|---|---|
| Method 11 | Pupil/Iris Ratio | IR LED Reflection | Eye Blinking |
| Method 12 | Pupil/Iris Ratio | IR LED Reflection | Gaze Point |
| Method 13 | Pupil/Iris Ratio | Eye Blinking | Gaze Point |
| Method 14 | IR LED Reflection | Eye Blinking | Gaze Point |
| Method 15 | Pupil/Iris Ratio | IR LED Reflection | Eye Blinking Gaze Point |

The present invention will now be described based on the constitution summarized in Table 1.

A method for identifying a living eye according to one embodiment of the present invention may include capturing an iris image while turning ON/OFF the light source mounted on the front side or one side of the iris recognition camera with a predetermined cycle, measuring a ratio of pupil size to iris size in the captured iris image, and determining that the iris is that of a living eye if there is a change in the ratio of pupil size to iris size.

A method for identifying a living eye according to another embodiment of the present invention may include capturing an iris image while turning ON/OFF the IR LEDs mounted on the front side or one side of the iris recognition camera with a predetermined cycle, recognizing IR LEDs reflected in the iris and/or the pupil in the captured iris image, and determining whether the iris is that of a living eye by measuring a change in the number or location of IR LEDs reflected in the iris and/or the pupil.

A method for identifying a living eye according to a further embodiment of the present invention may include capturing an iris image while inducing eye blinking using the external signal generator, such as the indicator LED or the voice guider configured to generate voice guidance, mounted on the front side or one side of the camera, measuring a change in iris area in the captured iris image, and determining that the iris is that of a living eye if there is a change in the iris area.

A method for identifying a living eye according to yet another embodiment of the present invention may include capturing an iris image while inducing movement of a gaze point (glance), measuring a change of the gaze point in the captured iris image, and determining that the iris is that of a living eye if there is a change of the gaze point.

In order to increase accuracy of determining whether an iris is that of a living eye, a method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while turning ON/OFF the IR LEDs with a predetermined cycle, recognizing IR LEDs reflected in the iris and/or the pupil in the captured iris image, and determining whether the iris is that of a living eye by measuring change of the number or location of IR LEDs reflected in the iris and/or the pupil.

A method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while inducing eye blinking using the external signal generator such as the indicator LED and/or the voice guider configured to generate voice guidance, measuring a change in iris area in the captured iris image, and determining that the iris is that of a living eye if there is a change in the iris area.

A method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while inducing movement of a gaze point using the external signal generator such as the indicator LED and/or the voice guider configured to generate voice guidance, measuring a change of the gaze point in the captured iris image, and determining that the iris is that of a living eye if there is a change of the gaze point.

A method for identifying a living eye according to yet another embodiment of the present invention may include capturing an iris image while turning ON/OFF the IR LEDs mounted on the front side or one side of the camera with a predetermined cycle, recognizing IR LEDs reflected in the iris and/or the pupil in the captured iris image, determining whether the iris is that of a living eye by measuring a change in the number or location of IR LEDs reflected in the iris and/or the pupil, capturing an iris image while inducing eye blinking using the external signal generator such as the indicator LED and/or the voice guider configured to generate voice guidance, measuring a change in iris area in the captured iris image, and determining that the iris is that of a living eye if there is a change in the iris area.

A method for identifying a living eye according to yet another embodiment of the present invention may include capturing an iris image while turning ON/OFF the IR LEDs mounted on the front side or one side of the camera with a predetermined cycle, recognizing IR LEDs reflected in the iris and/or the pupil in the captured iris image, determining whether the iris is that of a living eye by measuring a change in the number or location of IR LEDs reflected in the iris and/or the pupil, capturing an iris image while inducing movement of a gaze point using the external signal generator such as the indicator LED and/or the voice guider configured to generate voice guidance, measuring a change of the gaze point in the captured iris image, and determining that the iris is that of a living eye if there is a change of the gaze point.

A method for identifying a living eye according to yet another embodiment of the present invention may include capturing an iris image while inducing eye blinking using the external signal generator such as the indicator LED and/or the voice guider configured to generate voice guidance, measuring a change in iris area in the captured iris image, determining that the iris is that of a living eye if there is a change in iris area, capturing an iris image while inducing movement of a gaze point using the external signal generator such as the indicator LED and/or the voice guider configured to generate voice guidance, measuring a change of the gaze point in the captured iris image, and determining that the iris is that of a living eye if there is a change of the gaze point.

A method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while turning ON/OFF the IR LEDs mounted on the front side or one side of the camera with a predetermined cycle, recognizing IR LEDs reflected in the iris and/or the pupil in the captured iris image, determining whether the iris is that of a living eye by measuring a change in the number or location of IR LEDs reflected in the iris and/or the pupil, capturing an iris image while inducing eye blinking using the external signal generator such as the indicator LED and/or the voice guider, measuring a change in iris area in the captured iris image, and determining that the iris is that of a living eye if there is a change in the iris area.

A method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while turning ON/OFF the IR LEDs mounted on the front side or one side of the camera with a predetermined cycle, recognizing IR LEDs reflected in the iris and/or the pupil in the captured iris image, determining whether the iris is that of a living eye by measuring a change in the number or location of IR LEDs reflected in the iris and/or the pupil, capturing an iris image while inducing movement of a gaze point using the external signal generator such as the indicator LED and/or the voice guider, measuring a change of the gaze point in the captured iris image, and determining that the iris is that of a living eye if there is a change of the gaze point.

A method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while inducing eye blinking using the external signal generator such as the indicator LED and/or the voice guider, measuring a change in iris area in the captured iris image, determining that the iris is that of a living eye if there is a change in iris area, capturing an iris image while inducing movement of a gaze point using the external signal generator such as the indicator LED and/or the voice guider, measuring a change of the gaze point in the captured iris image, and determining that the iris is that of a living eye if there is a change of the gaze point.

A method for identifying a living eye according to yet another embodiment of the present invention may include capturing an iris image while turning ON/OFF the IR LEDs mounted on the front side or one side of the camera with a predetermined cycle, recognizing IR LEDs reflected in the iris and/or the pupil in the captured iris image, determining whether the iris is that of a living eye by measuring a change in the number or location of IR LEDs reflected in the iris and/or the pupil, capturing an iris image while inducing eye blinking using the external signal generator such as the indicator LED and/or the voice guider, measuring a change in iris area in the captured iris image, determining that the iris is that of a living eye if there is a change in iris area, capturing an iris image while inducing movement of a gaze point using the external signal generator such as the indicator LED and/or the voice guider, measuring a change of the gaze point in the captured iris image, and determining that the iris is that of a living eye if there is a change of the gaze point.

A method for identifying a living eye according to yet another embodiment of the present invention may include capturing an iris image while turning ON/OFF the light source mounted on the front side or one side of the camera with a predetermined cycle, measuring a ratio of pupil size to iris size in the captured iris image, determining that the iris is that of a living eye if there is a change in the ratio of pupil size to iris size, capturing an iris image while turning ON/OFF the IR LEDs mounted on the front side or one side of the camera with a predetermined cycle, recognizing IR LEDs reflected in the iris and/or the pupil in the captured iris image, determining whether the iris is that of a living eye by measuring a change in the number or location of IR LEDs reflected in the iris and/or the pupil, capturing an iris image while inducing eye blinking using the external signal generator such as the indicator LED and/or the voice guider, measuring a change in iris area in the captured iris image, determining that the iris is that of a living eye if there is a change in iris area, capturing an iris image while inducing movement of a gaze point using the external signal generator such as the indicator LED and/or the voice guider, measuring a change of the gaze point in the captured iris image, and determining that the iris is that of a living eye if there is a change of the gaze point.

In yet another embodiment of the present invention, the process of recognizing a change of the number of IR LEDs reflected in the iris and the pupil may include checking whether the number of IR LEDs reflected in the iris and the pupil in the iris image frames is repeatedly changed.

In yet another embodiment of the present invention, the process of recognizing a change of the number of IR LEDs reflected in the iris and the pupil may include checking whether the number of IR LEDs reflected in the iris and the pupil in the iris image frames is changed in synchronization with the cycle set to turn the IR LEDs on or off.

In yet another embodiment of the present invention, the process of recognizing a change of the location of IR LEDs reflected in the iris and the pupil may include checking whether the location of IR LEDs reflected in the iris and the pupil in the iris image frames is repeatedly moved to the left or right side or both sides.

In yet another embodiment of the present invention, the process of recognizing a change of the location of IR LEDs reflected in the iris and the pupil may include checking whether the location of IR LEDs reflected in the iris and the pupil in the iris image frames is moved to the left or right side or both sides in synchronization with the cycle set to turn the IR LEDs on or off.

A method and apparatus for identifying a living eye according to the present invention is provided with IR LEDs and a light source mounted on a front side or one side of an iris recognition camera to change ambient brightness, and can determine whether an iris captured by the iris recognition camera is that of a living eye based on one or more criteria of whether a ratio of pupil size to iris size changes by a change of the ambient brightness, whether the number or location of IR LEDs reflected in an iris and/or a pupil changes, whether an iris image area changes upon eye blinking, and whether a gaze point changes, thereby preventing identity theft and thus increasing industrial applicability.

What is claimed is:

1. A method for identifying a living eye, comprising:
    capturing an iris image while turning ON/OFF IR LEDs mounted on an iris recognition camera with a predetermined pulse;
    recognizing IR LEDs reflected in an iris or a pupil in the captured iris image;
    determining whether IR LEDs reflected in the iris or the pupil changes in synchronization with the pulse set to turn on or off IR LEDs;
    recognizing a change in the number or location of IR LEDs reflected in the iris or the pupil;
    determining that the iris is that of a living eye if IR LEDs reflected in the iris or the pupil changes in synchronization with the pulse set to turn on or off and a change in the number or location of IR LEDs reflected in the iris or the pupil is recognized.

2. The method of claim 1, further comprising:
    capturing an iris image while inducing eye blinking using an external signal generator including an indicator LED or a voice guider mounted on the iris recognition camera;
    measuring a change in iris area in the captured iris image; and
    determining that the iris is that of a living eye if there is a change in. the iris area.

3. The method of claim 1, further comprising:
    capturing an iris image while inducing movement of a gaze point using an external signal generator including an indicator LED or a voice guider mounted on or built in the iris recognition camera;
    measuring a change of the gaze point in the captured iris image; and
    determining that the iris is that of a living eye if there is a change of the gaze point.

4. The method of claim 3, further comprising:
    capturing an iris image while inducing movement of a gaze point using an external signal generator including an indicator LED or a voice guider mounted on or built in the iris recognition camera;
    measuring a change of the gaze point in the captured iris image; and
    determining that the iris is that of a living eye if there is a change of the gaze point.

5. The method of claim 1 wherein the measuring a change of the number of IR LEDs reflected in the iris and the pupil includes checking whether the number of IR LEDs reflected in the iris and the pupil in iris image frames is repeatedly changed.

6. The method of claim 1 wherein the measuring a change of the location of IR LEDs reflected in the iris and the pupil includes checking whether the location of IR LEDs reflected in the iris and the pupil in iris image frames is repeatedly moved to the left or right side or both sides.

7. An apparatus for identifying a living eye using an iris recognition camera, comprising:
    a camera lens for capturing an iris image;
    a light source mounted on the iris recognition. camera and configured to he turned on or off with a predetermined cycle to cause a change of a pupil size by changing ambient brightness;
    IR LEDs mounted on the iris recognition camera and configured to he turned on or off with a predetermined cycle to generate IR LED reflection from an iris or a pupil; and
    means for determining that the iris is that of a living eye if IR LEDs reflected in the iris or the pupil changes in synchronization with the pulse set to turn on or off and a change in the number or location of IR LEDs reflected in the iris or the pupil is recognized.

8. The apparatus of claim 7, further comprising:
    an external signal generator including an indicator LED or a voice guider for determining whether the iris is that of a living eye based on change in iris area upon eye blinking and a change of a gaze point.

9. The apparatus of claim 7, wherein a change of the number of IR LEDs reflected in the iris and the pupil is measured by checking whether the number of IR LEDs reflected in the iris and the pupil in iris image frames is repeatedly changed.

10. The apparatus of claim 7 wherein the means for determining whether the iris is that of a living eye checks whether a ratio of pupil size to iris size changes by a change of ambient brightness or whether the number or location of IR LEDs reflected in the iris and the pupil changes using the iris image captured by the iris recognition camera, or wherein the means for determining whether the iris is that of a living eye checks both whether a ratio of pupil size to iris size changes by a change of ambient brightness and whether the number or location of IR LEDs reflected in the iris and the pupil changes using the iris image captured by the iris recognition camera.

11. The apparatus of claim 7 wherein a change of the location of IR LEDs reflected in the iris and the pupil is measured by checking whether the location of IR LEDs reflected in the iris and the pupil in iris image frames is repeatedly moved to the left or right side or both sides.

12. The apparatus of claim 7 wherein a pulse with a regular or irregular cycle is supplied as a signal for operating the IR LEDs.

13. The apparatus of claim 12 wherein the cycle of the pulse for turning the IR LEDs on is set to be longer than an iris image frame captured by the iris recognition camera.

* * * * *